US010254835B2

(12) United States Patent
Yun et al.

(10) Patent No.: US 10,254,835 B2
(45) Date of Patent: Apr. 9, 2019

(54) METHOD OF OPERATING AND ELECTRONIC DEVICE THEREOF

(71) Applicant: Samsung Electronics Co., Ltd., Gyeonggi-do (KR)

(72) Inventors: Yong-Sang Yun, Gyeonggi-do (KR); Young-Soo Park, Gyeonggi-do (KR); Yang-Wook Kim, Gyeonggi-do (KR); Hee-Sung Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 51 days.

(21) Appl. No.: 14/272,616

(22) Filed: May 8, 2014

(65) Prior Publication Data

US 2014/0333553 A1 Nov. 13, 2014

(30) Foreign Application Priority Data

May 13, 2013 (KR) ........................ 10-2013-0053870

(51) Int. Cl.
*G06F 3/01* (2006.01)
*G06F 3/041* (2006.01)
*G06F 3/0354* (2013.01)

(52) U.S. Cl.
CPC .......... *G06F 3/016* (2013.01); *G06F 3/03545* (2013.01); *G06F 3/0416* (2013.01)

(58) Field of Classification Search
CPC .......... G06F 3/016; G06F 3/033; G06F 3/041; G06F 3/03545

USPC ..................... 345/173–179; 178/18.01–18.09
See application file for complete search history.

(56) References Cited

U.S. PATENT DOCUMENTS

| 4,667,182 A | 5/1987 | Murphy | |
| 2001/0006383 A1* | 7/2001 | Fleck | G06F 3/03545 345/179 |
| 2003/0217871 A1* | 11/2003 | Chao | G06F 3/046 178/18.01 |
| 2004/0125089 A1* | 7/2004 | Chao | G06F 3/03545 345/179 |
| 2005/0248549 A1 | 11/2005 | Dietz et al. | |
| 2006/0158440 A1* | 7/2006 | Ashenbrenner | G06F 3/016 345/179 |
| 2008/0143693 A1 | 6/2008 | Schena | |
| 2009/0135164 A1* | 5/2009 | Kyung | G06F 3/03545 345/179 |
| 2009/0292990 A1* | 11/2009 | Park | G06F 3/016 715/702 |
| 2010/0194547 A1* | 8/2010 | Terrell | A63F 13/06 340/407.2 |
| 2012/0075086 A1* | 3/2012 | Takasu | G06F 3/016 340/407.2 |

(Continued)

FOREIGN PATENT DOCUMENTS

JP 2006-31410 A 2/2006
KR 10-2009-0054362 A 5/2009

*Primary Examiner* — Stacy Khoo
(74) *Attorney, Agent, or Firm* — Cha & Reiter, LLC.

(57) ABSTRACT

A method of operating a haptic-enabled electronic device includes detecting an input interaction between the haptic-enabled electronic device and a touchscreen-enabled electronic device selecting a vibration command in associated with the input, and vibrating the haptic-enabled electronic device in response to the vibration command.

27 Claims, 14 Drawing Sheets

(56) References Cited

U.S. PATENT DOCUMENTS

| | | | |
|---|---|---|---|
| 2012/0127088 A1* | 5/2012 | Pance | G06F 3/016 345/173 |
| 2013/0082976 A1* | 4/2013 | Kang | G06F 3/0418 345/174 |
| 2013/0307829 A1* | 11/2013 | Libin | G06F 3/046 345/179 |

\* cited by examiner

METHOD OF OPERATING AND ELECTRONIC DEVICE THEREOF

CROSS REFERENCE TO RELATED APPLICATION

This application claims the benefit under 35 U.S.C. § 119(a) of a Korean patent application filed in the Korean Intellectual Property Office on May 13, 2013 and assigned Ser. No. 10-2013-0053870, the entire disclosure of which is hereby incorporated by reference.

TECHNICAL FIELD

The present invention relates to electronic input devices, and, more particularly to providing vibrational feedback to an electronic input device.

BACKGROUND

With the rapid development of various electronic communication technologies, portable electronic devices have become widely ubiquitous in recent years. To cope with user requirements, the electronic device has successively become smaller, lighter, thinner, and simpler, even while functions executable by the devices have been more diversified.

Examples of the electronic device may include a mobile phone such as a smart phone, a mobile pad, a media player, a tablet computer, a handheld computer, a Personal Digital Assistant (PDA), etc.

A number of peripheral devices attached, coupled or added to the electronic device has also been under development in accordance with the rapid development of the electronic communication technique. Examples of the peripheral devices include an auxiliary memory card, an ear microphone installed to the electronic device to communicate with a peer user, a Bluetooth headset mounted on the electronic device to perform near field communication by the use of a Bluetooth module, and a stylus for facilitating a manipulation of a touch screen in which an input and an output are simultaneously performed.

One such portable electronic device may be the so-called smart phone. The smart phone may utilize a touch screen in which inputs and outputs are simultaneously performed on a large screen.

A touch panel used in the touch screen may be implemented using a resistive-type touch panel, a capacitive-type touch panel, an ultrasonic wave-type touch panel, an optical (infrared) sensor-type touch panel, a touch panel using an electromagnetic resonance, etc.

An electronic device having the aforementioned various types of touch screen may include a specific-length stylus having a tip, of which an end portion is sharp, the stylus attachable to and detachable from the electronic device to increase convenience, accuracy and variety of touch inputs.

SUMMARY

One aspect of the present disclosure is to provide an operation method between a first electronic device having a touch screen and a second electronic device, and the electronic device implementing the operation thereof.

Another aspect of the present disclosure is to provide a method and apparatus for transmitting and receiving data between a first electronic device and a second electronic device by using a near field communication scheme.

Another aspect of the present invention is to provide an apparatus having an input means capable of performing a contact touch input or a non-contact touch input and a sound input/output means.

Another aspect of the present disclosure is to provide various haptic effects by using a second electronic device.

In accordance with one aspect of the present disclosure, a method of operating a first electronic device is provided. The method includes detecting an input interaction between a first and second electronic device while the first electronic device is executing at least one of flash content, an Internet web browser, or an application. A vibration command is determined in response to the vibration event, and transmitted to the second electronic device.

In accordance with another aspect of the present disclosure, a method of operating a second electronic device is provided. The method includes generating an input interaction with a first electronic device while the first electronic device executes at least one of flash content, an Internet web browser, or an application. A vibration command is then received by the second electronic device from the first electronic device, and the second electronic device is vibrated in response to the vibration command.

In accordance with another aspect of the present disclosure, a first electronic device is provided. The first electronic device includes a touch screen for detecting an input from a second electronic device while executing at least one of flash content, an Internet web browser, or an application. The first electronic device includes a processor configured to select a vibration command in associated with the input, and transmit the vibration command to the second electronic device.

In accordance with another aspect of the present disclosure, a second electronic device is provided. The device includes a hollow housing having a specific length, a plurality of vibration members disposed within the hollow housing, such that at least a portion of the vibration member overlaps, and a controller for operating the plurality of vibration members. The controller operates the plurality of vibration members according to a vibration command from a first electronic device or when an input of the second electronic device satisfies a pre-determined condition.

In accordance with another aspect of the present disclosure, a method of operating a first electronic device and a second electronic device is provided. The method includes generating an input to the first electronic device by the second electronic device while the first electronic device is executing at least one of a flash file, an Internet web browser, or an application. The vibration event is detected by the first electronic device, which then selects a vibration command in response to the vibration event, and transmits the vibration command to the second electronic device. The vibration command is received by the second electronic device, and vibrates in response to the vibration command.

BRIEF DESCRIPTION OF THE DRAWINGS

The above and other aspects and features of certain example embodiments of the present disclosure will be more apparent from the following detailed description taken in conjunction with the accompanying drawings, in which.

DETAILED DESCRIPTION

Figure 1A:
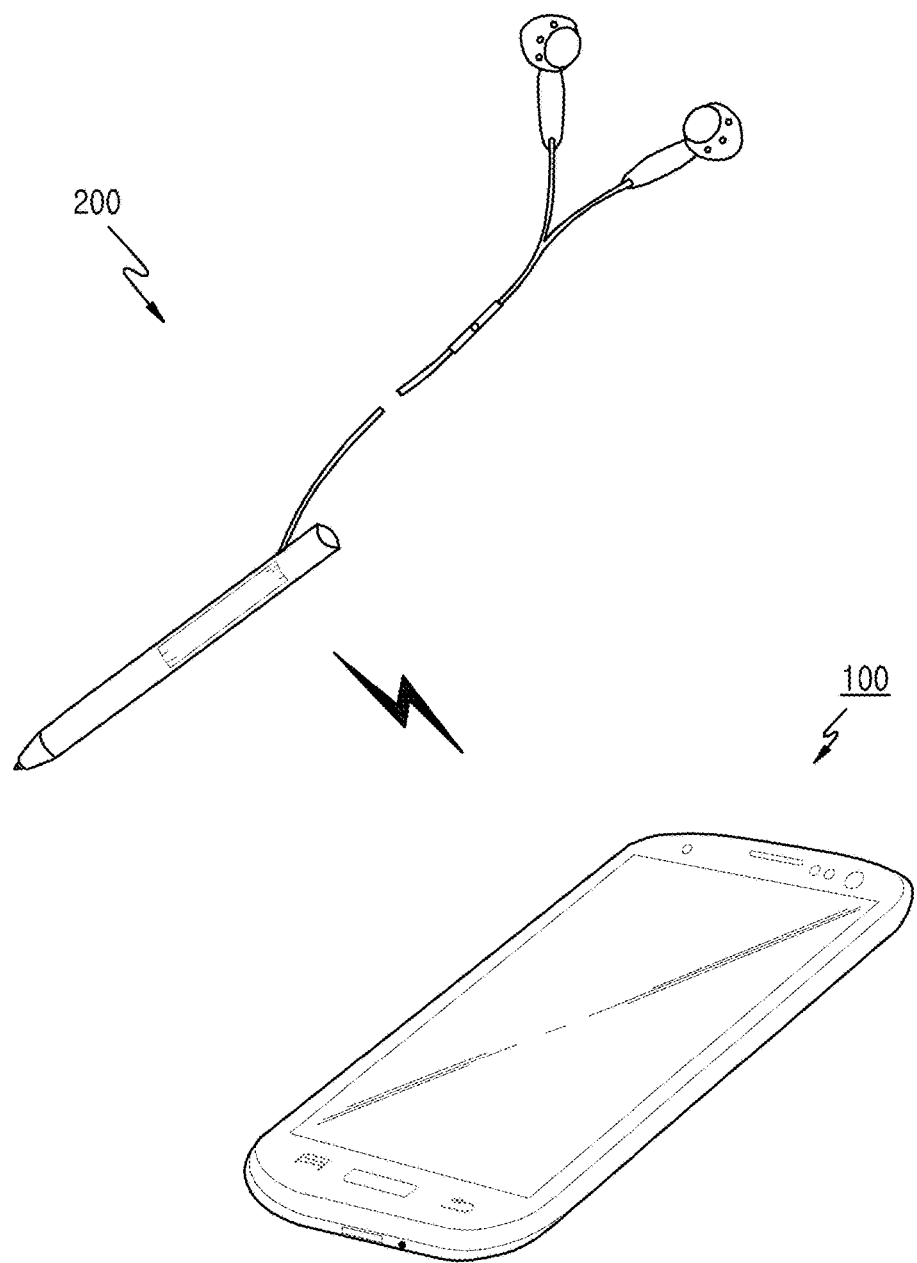
FIG. 1A is a perspective view illustrating an external appearance of a first electronic device and a second electronic device according to various example embodiments of the present disclosure.

While the embodiments may be susceptible to various modifications and alternative forms, at least one specific embodiment thereof has been shown by way of example in the drawings and will herein be described in detail. It should be understood, however, that it is not intended to limit the disclosure to the particular form disclosed, but, on the contrary, the intention is to cover all modifications, equivalent, and alternatives falling within the disclosure as defined by the appended claims.

It will be understood that although the terms "first" and "second" are used herein to describe various elements, these elements should not be limited by these terms. These terms are only used to distinguish one element from another element. For example, a first component may be termed a second component, and similarly, the second component may be termed the first component without departing from the disclosure.

When a component is mentioned as being "connected" to or "accessing" another component, this may mean that it is directly connected to or accessing the other component, but it is to be understood that there are no intervening components present. On the other hand, when a component is mentioned as being "directly connected" to or "directly accessing" another component, it is to be understood that there are no intervening components present.

The terminology is used herein for the purpose of describing particular embodiments only and is not intended to be limiting of the disclosure. A singular expression includes a plural concept unless there is a contextually distinctive difference. In this description, the term "include" or "have" is intended to indicate that characteristics, numbers, steps, operations, components, elements, etc. disclosed in the specification or combinations exist. As such, the term "include" or "have" should be understood that there are additional possibilities of one or more other characteristics, numbers, steps, operations, components, elements or combinations.

Example embodiments of the present disclosure will be described below with reference to the accompanying drawings. In the following description, well-known functions or implementations are not described in detail since they would obscure the disclosure in unnecessary detail. Also, the terms used herein are defined according to the functions of the present disclosure. Thus, the terms may vary depending on user or operator intention and usage. That is, the terms used herein may be understood based on the descriptions made herein.

Although a communication portable terminal having a touch screen is illustrated and described as a first electronic device according to various example embodiments of the disclosure, the disclosure is not limited thereto. Various devices having a touch screen can be used as the first electronic device, for example, a Personal Digital Assistant (PDA), a laptop computer, a smart phone, a netbook, a Mobile Internet Device (MID), a Ultra Mobile Personal Computer (UMPC), a tablet Personal Computer (PC), a navigator, an Motion Picture Experts Group Layer 3 (MP3) player, etc. In addition, although it is illustrated that a second electronic device is a pen-shaped stylus, the disclosure is not limited to this configuration. For example, the second electronic device may include various electronic devices such as a trackball, a mouse, a headset, etc.

In particular, the various embodiments relate to an operation method between an electronic device having a touch screen and a second electronic device, and the electronic device thereof.

Hereinafter, an operation method and an electronic device thereof will be described according to various example embodiments of the present disclosure.

Figure 1B:
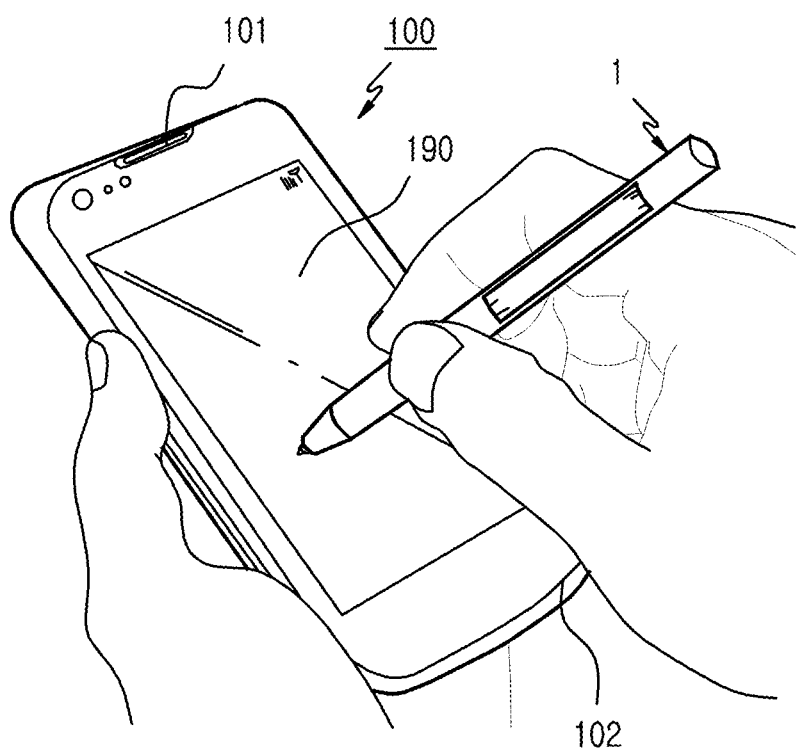
FIG. 1B is a perspective view illustrating a state of manipulating a first electronic device by a second electronic device according to various example embodiments of the present disclosure.

FIG. 1A is a perspective view illustrating an external appearance of a first electronic device and a second electronic device according to various example embodiments of the present disclosure. FIG. 1B is a perspective view illustrating a state of manipulating a second electronic device by a first electronic device according to various example embodiments of the present disclosure.

Referring to FIG. 1A and FIG. 1B, a first electronic device 100 may include a touch screen 190 in a front surface thereof. An ear piece 101 can be disposed to an upper portion thereof, and a microphone 102 can be disposed to a lower portion thereof.

According to various example embodiments, the touch screen 190 of the first electronic device 100 may include a touch panel (see 192 of FIG. 5) for recognizing a touch made by a human body part of a user, e.g., a finger or a palm, and a pen touch panel (see 193 of FIG. 5) for detecting an input of the stylus 1 which is an example of one implementation of a second electronic device 200.

The touch panel 192 may be a touch panel for recognizing an input of data when a user's finger is directly in contact with a surface of the touch screen 190 according to a capacitive-type or a resistive-type.

The pen touch panel 193 may be an electromagnetic induction-type touch panel which can detect an approach of the stylus 1 when the stylus is present within a specific distance of the touch screen 190 without making direct contact, or may be a space touch panel such as an acoustic wave-type touch panel or an infrared-type touch panel.

According to various example embodiments, a capacitive-type touch panel can be used as the touch panel 192 for recognizing a contact of a human body part of a user, e.g., a finger or a palm, and an electromagnetic induction-type digitizer plane can be applied as the pen touch panel 193.

In addition, when the user moves the stylus 1 (from FIG. 5) close to a sensing area without contacting the touch screen 190, a function of the touch panel 192 for detecting the human body part can be ignored to exclude possible input errors caused by a touch from a body part of the user. Therefore, when the user uses the stylus 1, a data input error caused by the touch of the human body part can be prevented, even if an egregious error occurs, such as a user's palm being placed on the touch screen 190.

The second electronic device 200 may possess a sound input/output means according to various example embodiments, and may be, for example, various electronic devices such as a stylus for providing a contact touch input or a non-contact input, a mouse, a headset, etc. The second electronic device 200 can be connected with the first electronic device 100 via a wired or wireless fashion, and in the case of a wireless connection, a close range communication scheme can be used. For example, the close range communication scheme may include Bluetooth communication, near field communication (NFC), wireless hart communication, Zigbee communication, WiFi communication, etc., and can be connected using Bluetooth or WiFi. For example, by using such a communication function, the second electronic device 200 can set a sound input/output path of the first electronic device 100 to a sound input/output path of the second electronic device 200. In addition, according to various example embodiments, the second electronic device 200 can receive a vibration command from the first electronic device 100, and thus can vibrate in response to the vibration command.

It is described herein for example that the first electronic device 100 has a near field communication function, and the second electronic device 200 also has the near field communication function. For example, the first electronic device 100 and the second electronic device 200 can each have a communication module capable of performing communication by connecting a link according to the near field communication scheme.

Figure 2:
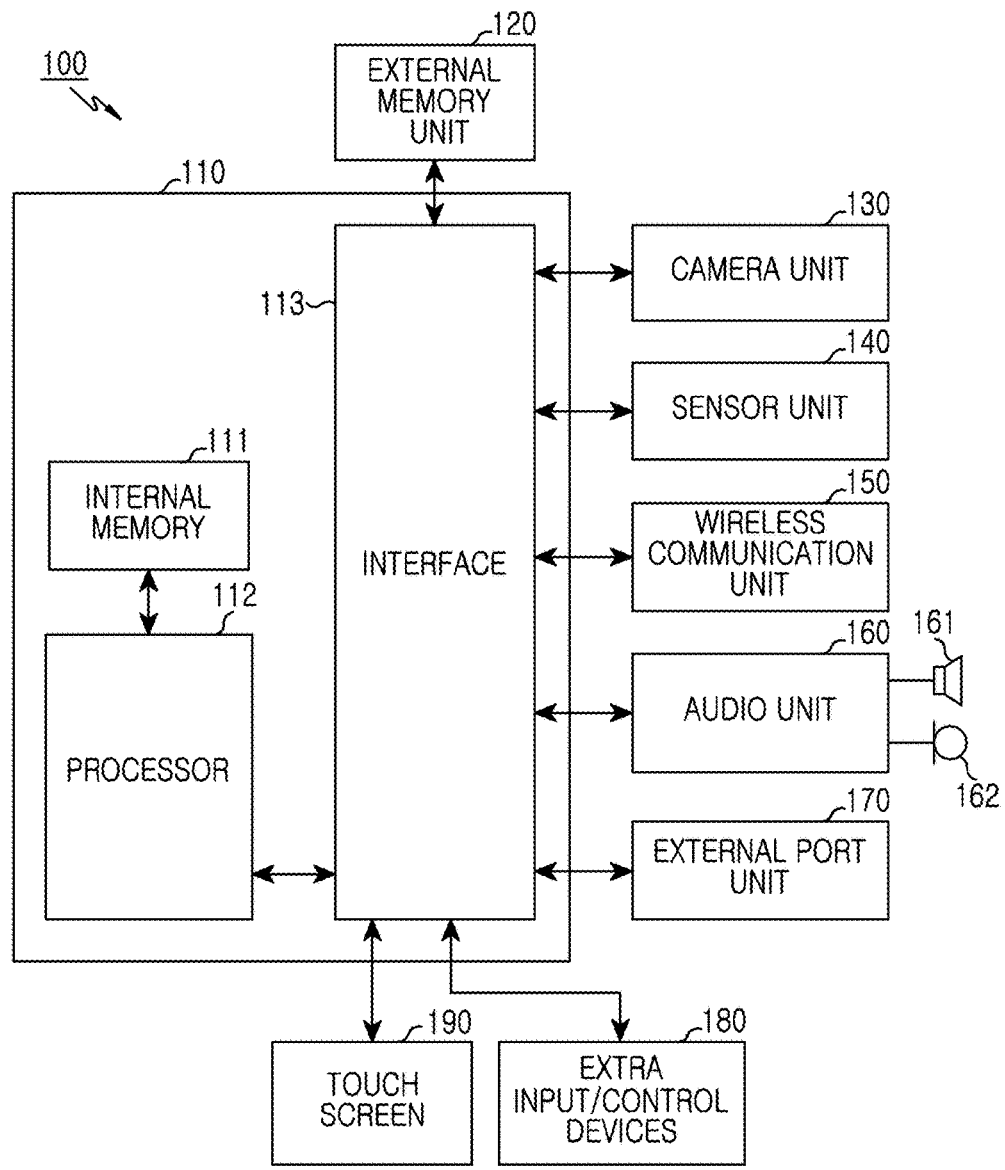
FIG. 2 is a block diagram illustrating a first electronic device according to one of various example embodiments of the present disclosure.

FIG. 2 is a block diagram illustrating a first electronic device according to one of various example embodiments of the present disclosure.

Referring to FIG. 2, a first electronic device 100 may be a mobile phone, a media player, a tablet computer, a handheld computer, or a PDA. In addition, it may be any portable electronic device including a device which combines two or more functions among these devices.

The first electronic device 100 may include a host unit 110, an external memory unit 120, a camera unit 130, a sensor unit 140, a wireless communication unit 150, an audio unit 160, an external port unit 170, a touch screen 190, and extra input/control devices 180. The external memory unit 120 and the external port unit 170 may be plural in number.

The host unit 110 may include an internal memory 111, one or more processors 112, and an interface 113. The internal memory 111, the one or more processors 112, and the interface 113 may be separate components or may be configured in one or more Integrated Circuits (ICs).

The processor 112 performs several functions for the first electronic device 100 by executing various software programs, and also processes and controls voice communication, video communication, and data communication. Further, in addition to the typical function, the processor 112 can execute a software module stored in the internal memory 111 and/or the external memory unit 120 and thus perform various functions corresponding to the module.

The processor 112 can perform the method according to various example embodiments of the present disclosure by interworking with the software modules stored in the internal memory 111 and/or the external memory unit 120. For example, the internal memory 111 or the external memory 120 may include a vibration command capable of transmitting a vibrating instruction to the second electronic device 200. The vibration command may have vibration information for controlling vibration strength, a vibration order, a vibration time, etc., and may include a vibration change depending on the vibration time.

In addition, the processor 112 may include one or more data processors, an image processor, or a COder/DECoder (CODEC). Further, the first electronic device 100 can separately configure the data processor, the image processor, or the CODEC.

The interface 113 connects the host unit 110 to several units of the first electronic device 100.

The camera unit 130 can perform a camera function such as photographing, video clip recoding, etc. The camera unit 130 may include a Charge Coupled Device (CCD), a Complementary Metal-Oxide-Semiconductor (CMOS), etc.

In addition, the camera unit 130 can adjust a change in a hardware configuration, e.g., a lens movement, an aperture number, etc., according to a camera program executed by the processor 112.

Various components of the first electronic device 100 can be connected through one or more communication buses (their reference numbers are not shown) or electrical connection means (their reference numbers are not shown).

The sensor unit 140 may include a motion sensor, an optical sensor, a temperature sensor, etc., and can support several functions. For example, the motion sensor can detect motion of the first electronic device 100, and the optical sensor can detect an ambient light beam.

The wireless communication unit 150 enables wireless communication, and may include a radio frequency transmitter/receiver and an optical (e g, infrared) transmitter/receiver. The wireless communication unit 150 can be designed to operate by using one of a Global System for Mobile communications (GSM) network, an Enhanced Data rates for GSM Evolution (EDGE) network, a Code Division Multiple Access (CDMA) network, a Wideband-CDMA (W-CDMA) network, a Long Term Evolution (LTE) network, an Orthogonal Frequency Division Multiple Access (OFDMA) network, a Wi-Fi network, a WiMax network, and/or a Bluetooth network according to a communication network.

The audio unit 160 is connected to a speaker 161 and a microphone 162, and performs an audio input and output function of voice recognition, voice recording, digital recording, telephony, etc. In addition, the audio unit 160 receives a data signal from the host unit 110, converts the received data signal into an electronic signal, and outputs the converted electronic signal via the speaker 161.

The speaker 161 outputs the electronic signal by converting the signal into an audible frequency band, and is disposed to a rear portion of the first electronic device 100. The speaker 161 may include a flexible film in which at least one piezoelectric member is attached to one oscillation film.

The microphone 162 can convert an acoustic wave delivered from a person or other sound sources into an electronic signal. In addition, the audio unit 160 receives an electronic signal from the microphone 162, converts the received electronic signal into an audio data signal, and transmits the converted audio data signal to the host unit 110. The audio unit 160 may include an earphone, headphone, or headset attachable to or detachable from the electric device 100.

The external port unit 170 connects the first electronic device 100 directly to another electronic device, or connects the first electronic device 100 indirectly to another electronic device via a network (e.g., an Internet, an intranet, a wireless Local Area Network (LAN), etc.).

The touch screen unit 190 can provide an input and output interface between the first electronic device 100 and the user. The touch screen unit 190 applies a touch sensing technique, delivers a touch input of the user to the host unit 110, and shows visual information (e.g., text, graphic, video, etc.) provided from the host unit 110 to the user. Further, the touch screen unit 190 may be implemented using capacitive technology, resistive technology, infrared ray techniques, and surface acoustic wave (SAW) techniques, but also any multi-touch sensing technique including other proximity sensor deployments or other elements. The touch screen 190 may include at least one of a Liquid Crystal Display (LCD), an Organic Light Emitting Diode (OLED), an Active Matrix Organic Emitting Diode (AMOLED), a flexible display, or a 3 Dimensional (3D) display.

The other input/control units 180 may include an up/down button for a volume control. In addition thereto, the other input/control units 180 may include at least one of pointer units such as a push button, a locker button, a locker switch, a thumb-wheel, a dial, a stick, or a stylus, etc., to which corresponding functions are assigned.

The external memory unit 120 may include any memory device such as one or more magnetic disc storage devices and/or a non-volatile memory, one or more optical storage devices, and/or a flash memory (e.g., NAND, NOR). The external memory unit 120 stores a software component. The software component may include an operating system module, a touch operation module, a communication module, a graphic module, a user interface module, a CODEC module, a camera module, and one or more application modules. The terminology of "module" is also expressed as a set of instructions or an instruction set or a program.

The operating system module is a built-in operating system such as WINDOWS, LINUX, Darwin, RTXC, UNIX, OS X, or VxWorks, and may include various software components for controlling a general system operation. The control of the general system operation may include memory management and control, storage hardware (device) control and management, power control and management, etc. In addition, the operating system module performs a function for facilitating communication between various hardware components (devices) and software components (modules).

The touch operation module may include not only a software component for correcting a touch error recognized by a touch panel IC and a pen touch panel IC but also various routines for supporting a touch panel operation according to the present disclosure. For example, the touch operation module may include a routine for supporting an activation of the touch panel 192 and the pen touch panel 193 and a routine for collecting a pen touch event and a finger touch event based on a finger, etc., in an activation operation of the touch panel 192 and the pen touch panel 193.

Further, the touch operation module may include a routine for supporting a classification of input touch event types by confirming device information of the touch panel 192 and device information of the stylus 1 based on a digitizer corresponding to the pen touch panel 193. In addition, the aforementioned touch operation module may include a routine for identifying a collected human body touch event based on a user and a pen touch event, and a routine for operating the identified touch events in reference to a specific touch operation table.

The communication module can enable communication with a peer electronic device such as a computer, a server, an electronic device, etc., via the wireless communication unit 150 or the external port unit 170.

The graphic module may include various software components for providing and displaying graphics on the touch screen 190. The terminology of "graphics" indicates a text, a web page, an icon, a digital image, a video, or an animation, etc.

The user interface module may include various software components related to a user interface. In addition, the user interface module may include the content related to how a state of the user interface changes, and the condition in which the state of the user interface changes.

The CODEC module may include a software component related to encoding and decoding of a video file.

The camera module may include a camera-related software component which enables camera-related processes and functions.

The application module may include a browser, an e-mail application, an instant messenger, word processor, keyboard emulator, an address book, a contact list, a widget, a Digital Rights Management (DRM), voice recognition, voice recording, a location determination function, a location-based service, etc.

In addition to the aforementioned modules, the host unit 110 may further include additional modules (or instructions). In addition, various functions of the first electronic device 100 of the present disclosure can be performed by using at least one stream processing and/or a hardware component including an Application Specific Integrated Circuit (ASIC) and/or a software component and/or a combination thereof.

Figure 3:
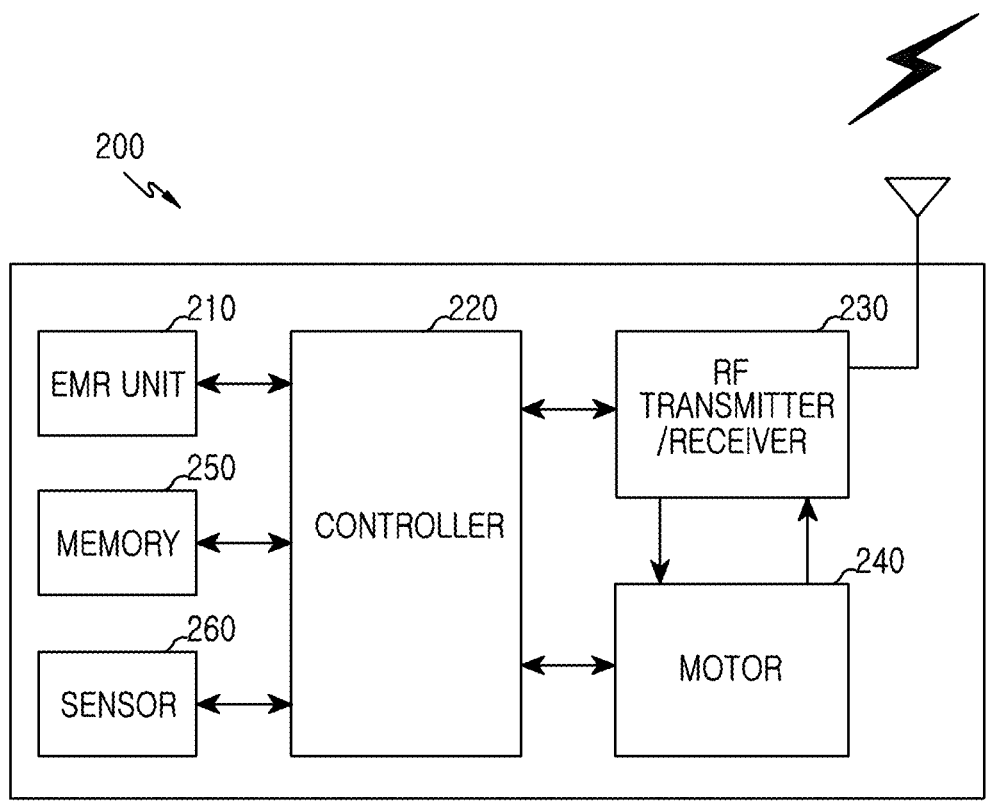
FIG. 3 is a block diagram illustrating a second electronic device according to one of various example embodiments of the present disclosure.

FIG. 3 is a block diagram illustrating a second electronic device according to one of various example embodiments of the disclosure.

Referring to FIG. 3, according to various example embodiments, a second electronic device 200 may include an Electro Magnetic Resonance (EMR) unit 210, a controller 220, an RF transmitter/receiver 230, a motor 240, a memory 250, and a sensor 260.

The EMR unit 210 may include a resonance circuit which leads to an inductance change according to an interval change with respect to a coil member due to a movement of a magnetic member, and thus can perform the aforementioned contact touch and non-contact touch input to the first electronic device 100 by using an electromagnetic induction scheme.

The controller 220 can process and control data communication with a peer electronic device by executing several software programs. For example, a software program (i.e., instruction set) stored in the memory 250 can be executed to perform several functions corresponding to the program.

The RF transmitter/receiver 230 may include a near field communication module to perform near field communication with the peer electronic device. For example, the RF transmitter/receiver 230 can transmit/receive data by connecting a link to the peer electronic device through a Bluetooth or WiFi communication module.

The motor 240 may include a plurality of vibration members disposed to an inner space of the second electronic device 200 such that at least a portion thereof overlaps, and thus can vibrate a corresponding vibration member in response to a vibration command. For example, a vibration order, a vibration strength, and a vibration time may be set differently in each of the plurality of vibration members.

The memory 250 may include at least one memory such as one or more magnetic disc storage devices, a non-volatile memory, one or more optical storage devices, or a flash memory. For example, the memory 250 may store a vibration command for controlling a vibration strength and a vibration time of the aforementioned vibration member.

The sensor 260 may include a motion sensor for detecting a motion of the second electronic device 200. For example, the motion sensor may include a gyro sensor and an acceleration sensor for detecting an acceleration or an angular velocity of the second electronic device 200. The motion sensor detects a dynamic force such as an acceleration, vibration, impact, etc., and can apply a principle of applying an inertial force, an electrostriction, and a gyro.

The second electronic device 200 can receive the vibration command delivered from the first electronic device 100 through near field communication, and the vibration command can be stored in the memory 250. In this case, the second electronic device 200 can operate the motor 240 according to an input in the first electronic device 100. For example, if the vibration command is not stored in the memory 250, the second electronic device 200 can receive the vibration command from the first electronic device 100 according to the input in the first electronic device 100.

According to various example embodiments, the second electronic device 200 can further include a sound input/output means (not shown). For example, by using such a communication function, the second electronic device 200 can set a sound input/output path of the first electronic device 100 to a sound input/output path of the second electronic device 200.

Figure 4:
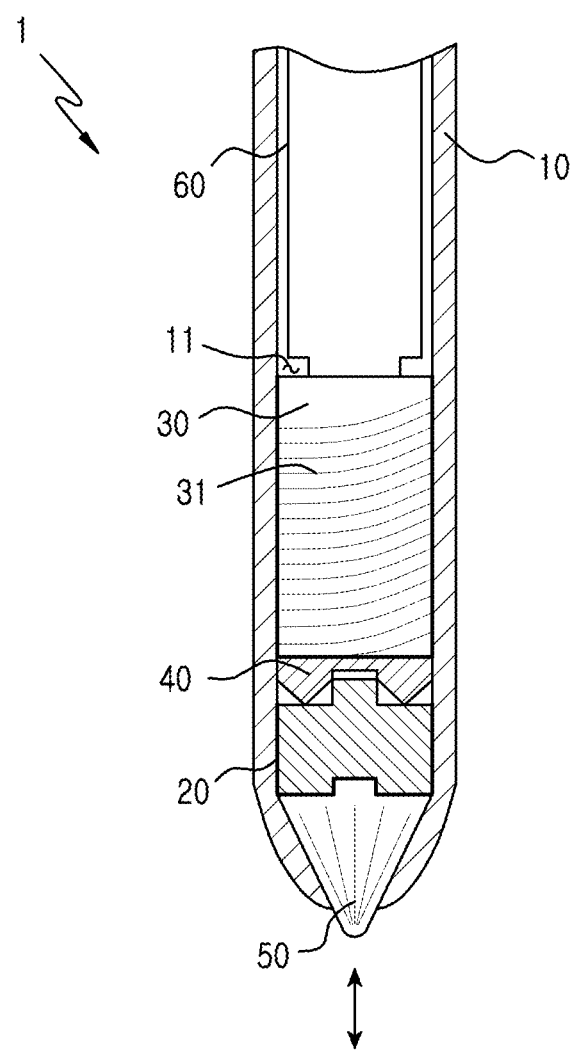
FIG. 4 is a cross-sectional view illustrating a structure of a stylus according to one of various example embodiments of the present disclosure.

FIG. 4 is a cross-sectional view illustrating a structure of a stylus 1 according to one of various example embodiments of the present disclosure.

Referring to FIG. 4, the aforementioned second electronic device 200 can be implemented with, for example, a stylus 1. The stylus 1 may include a hollow housing 10 having a specific length, a tip 50 which can be installed to an inner space 11 of the housing 10 in a movable manner and of which one end is exposed to the housing 10, a magnetic member 20 which moves together with the tip 50, a coil member 30 separated by a specific interval from the magnetic member 20, a board 60 having an oscillation circuit which leads to an inductance change according to an interval change with respect to the coil member 30 caused by the movement of the magnetic member 20, an elastic member 40 which is transformed when the tip 50 is pressed while maintaining an interval between the magnetic member 20 and the coil member 30 and thus leads to a change in the interval between the magnetic member 20 and the coil member 30, a plurality of vibration members (not shown) disposed to the inner space 11 such that at least a portion thereof overlaps, and a circuit board (not shown).

The tip 50 can be formed such that one portion thereof protrudes at an opening hole formed at an end portion of the housing 10, and the magnetic member 20 can be placed on a mounting surface which does not protrude. In this case, a protrusion can be formed on the mounting surface of the tip 50 and can be joined to a concave groove formed on a lower surface of the magnetic member 20. Thus, the magnetic member 20 can be guided to move together with the tip 50.

A ferrite chip can be used as the magnetic member 20. A guide protrusion is formed on an upper surface of the magnetic member 20 in a protrusion manner, and can be configured to be placed in a guide groove formed on the specific elastic member 40. The coil member 30 can have a coil 31 which is wound several times on an outer circumferential surface of a bar-shaped ferrite core. In addition, the coil member 30 can be closely affixed on the board 60 and configured not to move in the inner space 11 of the housing 10.

Therefore, the elastic member 40 can be disposed between the magnetic member 20 and the coil member 30. The elastic member 40 is separated by a specific interval so that the magnetic member 20 and the coil member 30 are not in contact with each other. The elastic member 40 supports the magnetic member 20 which is pulled in a direction of the coil member 30 by the tip 50. When a force (i.e., a pen pressure) exerted on the tip 50 is removed, a restoring force can be provided by the elastic member 40 so that the magnetic member 20 maintains an original interval from the coil member 30. The elastic member 40 can use a material (e.g., rubber, silicon, etc.) capable of maintaining an original shape even after a prolonged period of use.

According to various example embodiments, the aforementioned plurality of vibration members can vibrate on the basis of a solenoid principle. For example, the aforementioned solenoid may include a wire coil and a metal coil. If current flows through the wire coil, a magnetic field at a coil center can allow the metal core at a center to move within the coil center. For example, an electrical energy can be changed to a mechanical energy by using the solenoid when moving the metal core at the center of the wire coil.

According to various example embodiments, a circuit board is a board on which a basic circuit and a plurality of electronic components are mounted, and can set an execution environment of the stylus 1, maintain information thereof, reliably derive the stylus 1, and facilitate a data input/output exchange of all elements of the stylus 1.

Figure 5:
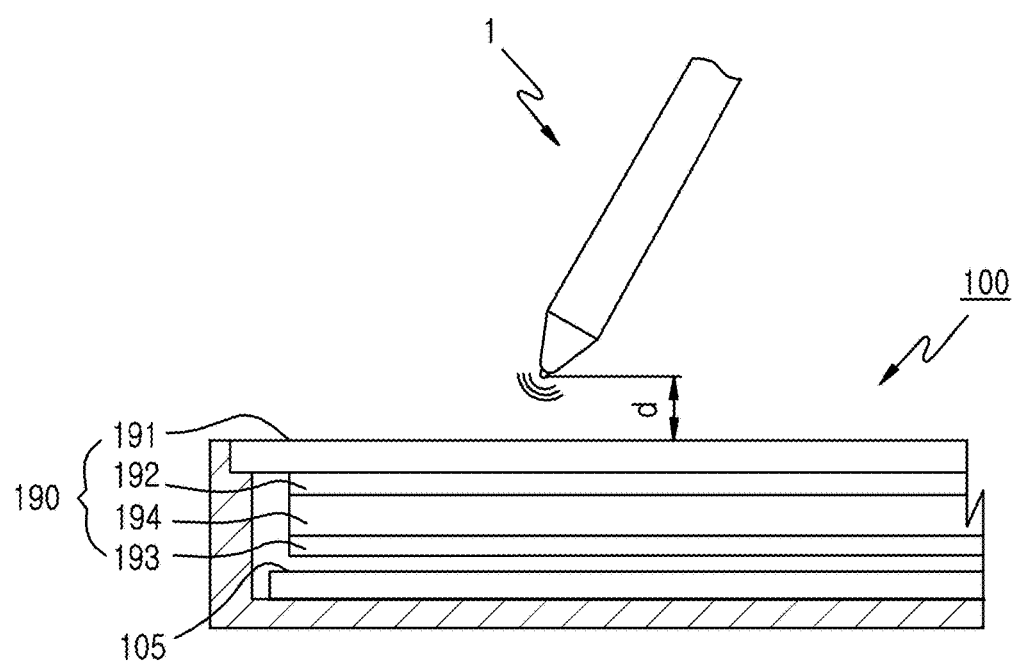
FIG. 5 is a cross-sectional view illustrating application of a stylus to a first electronic device according to one of various example embodiments of the disclosure.

FIG. 5 is a cross-sectional view illustrating a state where a stylus is applied to a first electronic device according to one of various example embodiments of the present disclosure.

Referring to FIG. 5, a first electronic device 100 may include a touch screen 190 configured by sequentially mounting a window 191, a touch panel 192, a display 194, and a pen touch panel 193 in an inner mounting space of a specific case frame. The transparent touch panel 192 can be mounted on a lower surface of the window 191 of the first electronic device 100 in a deposited manner, and the display 194 such as LCD can be mounted on a lower portion thereof.

Although not shown, the pen touch panel 193 may include a sensor Printed Circuit Board (PCB) in which a plurality of X-axis coil arrays and Y-axis coil arrays are orthogonally disposed, a shield plate installed to a lower portion of the sensor PCB to shield an external electromagnetic wave, and a connector electrically coupled to a main board 105 of the first electronic device 100. In addition, the pen touch panel 193 may be disposed to a lower portion of the additional touch panel 192 formed of a transparent material and the display 194 since a light-proof coil is included.

According to various example embodiments, an alternating current signal is applied to a coil formed on a sensing pad of the pen touch panel 193, and when the stylus 1 approaches within a specific distance D in the touch screen 190, a coil of the pen touch panel 193 adjacent to the stylus 1 can generate a magnetic field. In addition, a resonant frequency is generated in oscillation with the generated magnetic field in the stylus 1, and the generated resonant frequency is sensed by the processor 112 (from FIG. 2) of the first electronic device 100, and thus, a corresponding touch location can be recognized. The pen touch panel 193 can alternatively set a strength of the resonant frequency.

Although not shown, a filter can be used between several functional units indicated in a touch detector of the touch screen 190. For example, the filter can be used in a previous state of a buffer or a previous state of an amplifier, and various filters can be further applied such as a bandwidth high pass filter or a Grass Cut Filter (GCF), a ranking filter, an average filter based on chopping, etc.

Figure 6A:
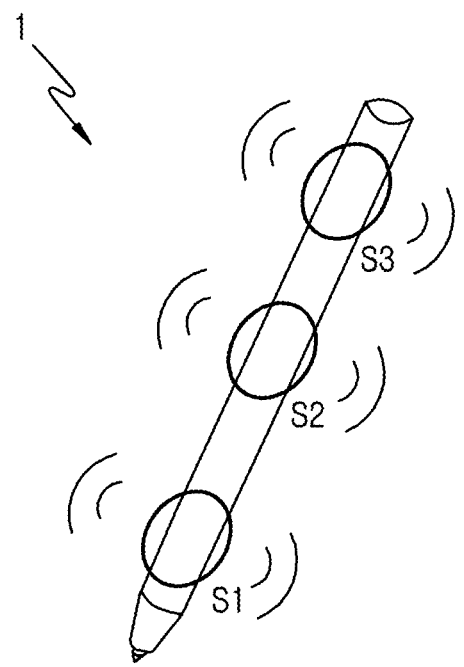
FIG. 6A illustrates a method of operating a first electronic device and a stylus according to one of various example embodiments of the present disclosure.
Figure 6B:
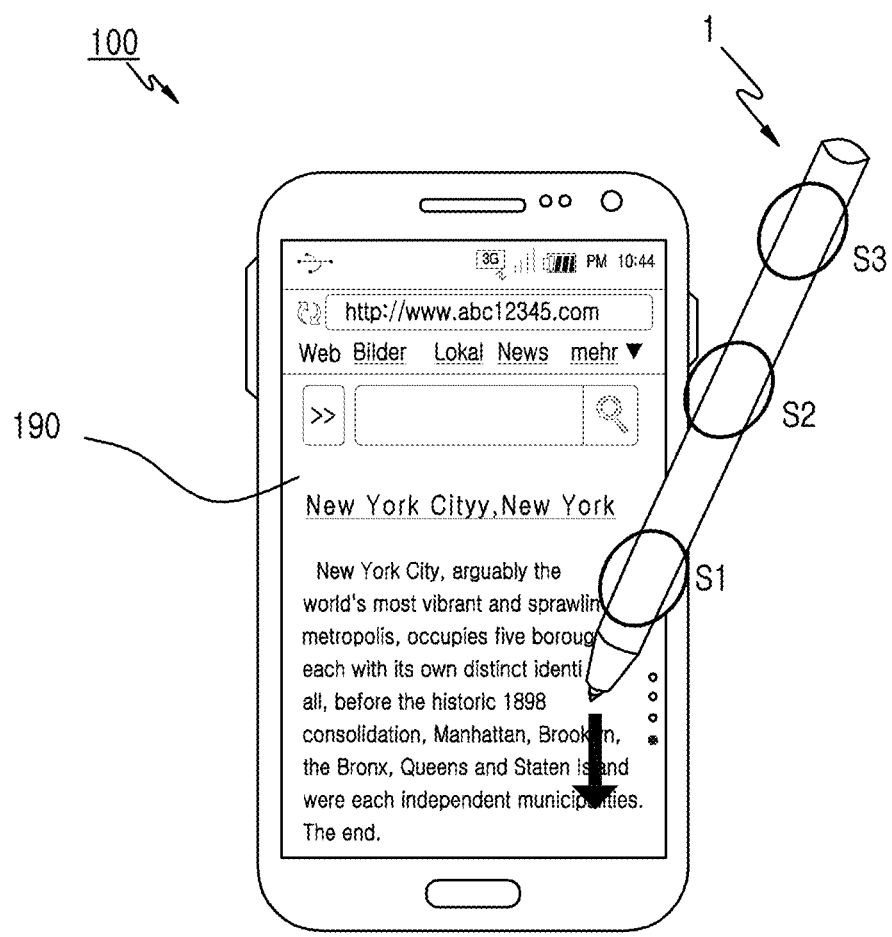
FIG. 6B illustrates a method of operating a first electronic device and a stylus according to one of various example embodiments of the present disclosure.

FIG. 6A and FIG. 6B illustrate a method of operating a first electronic device and a stylus according to one of various example embodiments of the present disclosure.

Referring to FIG. 6A and FIG. 6B, as described above, the stylus 1 can have a plurality of vibration members disposed such that at least a portion of the vibration members overlaps. For example, the vibration members can be respectively disposed to a lower point S1, a middle point S2, and an upper point S3. In addition, each of the vibration members can vibrate at a specific time and a specific strength. The stylus 1 can also include a vibration command for controlling the vibration member.

The stylus 1 can receive the vibration command delivered from the first electronic device 100 via near field communication, and the vibration command can be stored in a memory of the stylus 1. In this case, the stylus can vibrate according to an input in the first electronic device 100, and the stylus 1 can provide the vibration command so as to vibrate according to an application executed in the first electronic device 100. For example, if the vibration command is not stored in the memory, the stylus 1 can receive the vibration command from the first electronic device 100 according to the input in the first electronic device 100. If the vibration command is not stored in the memory of the stylus 1, the vibration member can operate according to the application even if the stylus 1 performs any one of a flicking, a touch-and-drag, a tap-and-hold, and a multi-tap on the touch screen 190.

According to various example embodiments, the stylus 1 can input a vibration event to the first electronic device 100. Herein, the vibration event may be an operation in which the stylus 1 performs any one of the flicking, the touch-and-drag, the tap-and-hold, and the multi-tap on the touch screen 190 of the first electronic device 100.

According to various example embodiments, the vibration event may be an event which is input by the stylus 1 in a state where the first electronic device 100 executes at least one of a flash content, an Internet web page, or an application. For example, as illustrated in FIG. 6B, if the first electronic device 100 displays the Internet web page in the touch screen 190, a user can scroll a screen up and down by touching and dragging the stylus 1 on the touch screen 190. In this case, the stylus 1 can vibrate, for example, when it cannot be further scrolled down. In addition, the stylus 1 can vibrate in the order of a lower point S1, a middle point S2, and an upper point S3, and can set a vibration strength and a vibration time for each point.

Figure 7:
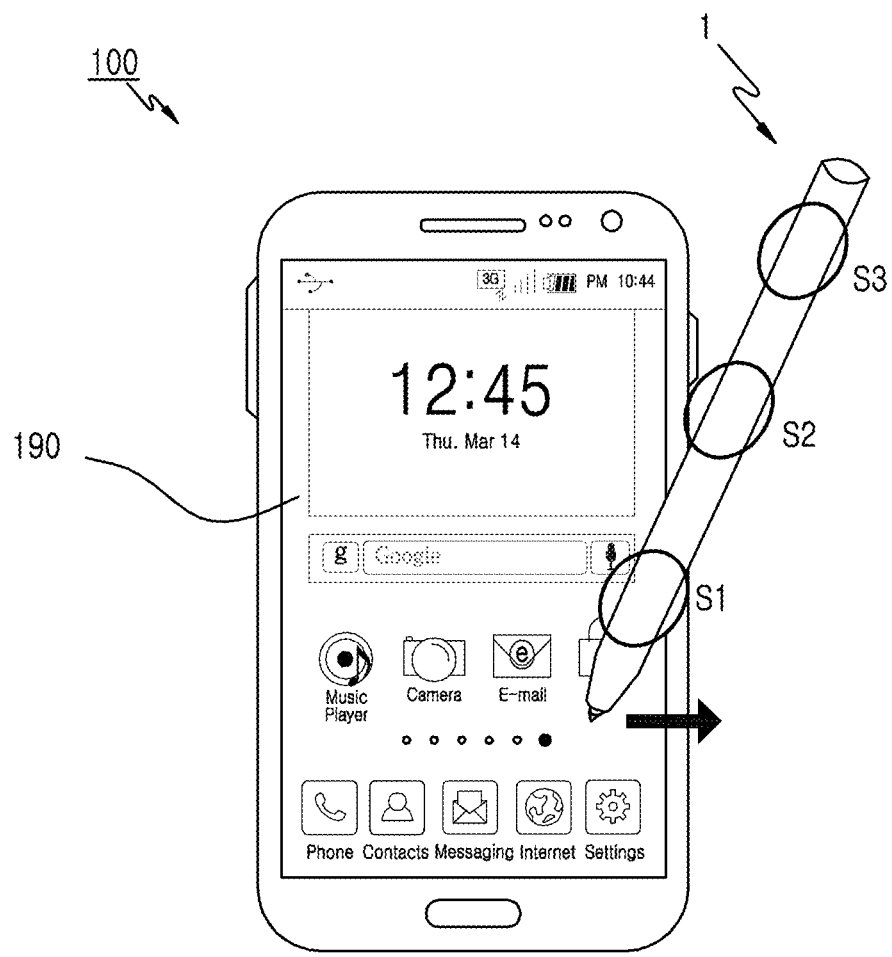
FIG. 7 illustrates a method of operating a first electronic device and a stylus according to one of various example embodiments of the present disclosure.

FIG. 7 illustrates a method of operating a first electronic device and a stylus according to one of various example embodiments of the present disclosure.

Referring to FIG. 7, if the first electronic device 100 displays a menu screen, a user can scroll the screen by touching and dragging the stylus 1 on the touch screen 190. In this case, the stylus 1 can vibrate, for example, when it cannot be further scrolled to the right. In addition, the stylus 1 can vibrate in the order of an upper point S3, a middle point S2, and a lower point S1, and can set a vibration strength and a vibration time for each point.

According to various example embodiments, if the first electronic device 100 executes a note application, a vibration mode can be set according to a note taking tool such as a pencil, a ballpoint pen, a brush, etc. In addition, the vibration mode may change according to a note mode such as a traditional Korean paper, a coarse paper, a printing paper, etc. For example, the vibration mode may include a vibration time, a vibration strength, etc., of a vibration member of the stylus.

For example, the stylus 1 can receive a vibration command delivered from the first electronic device 100 via near field communication, and the vibration command can be stored in a memory. In this case, the stylus 1 can provide the vibration command so as to vibrate according to an application executed in the first electronic device 100. For example, if the vibration command is not stored in the memory, the stylus 1 can receive the vibration command from the first electronic device 100 according to the input in the first electronic device 100.

Figure 8:
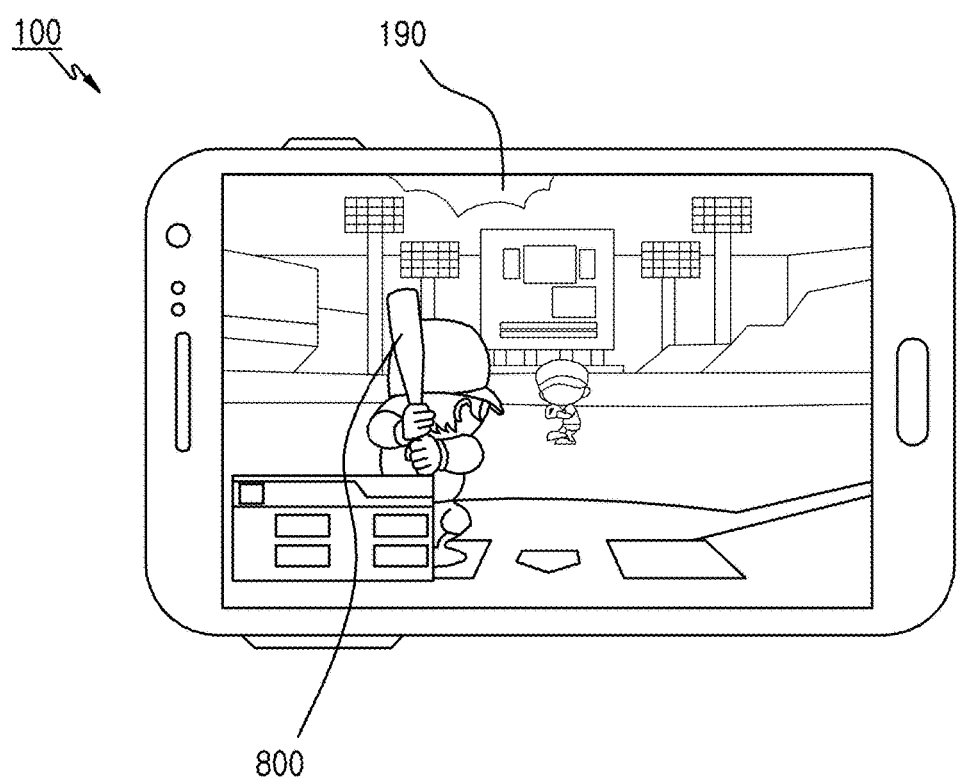
FIG. 8 illustrates a method of operating a first electronic device and a stylus according to one of various example embodiments of the present disclosure.

FIG. 8 illustrates a method of operating a first electronic device and a stylus according to one of various example embodiments of the present disclosure.

Referring to FIG. 8, according to various example embodiments, if a user executes a baseball game application, the user can swing a bat 800 by touching or by touching and dragging the stylus 1 on the touch screen 190. For example, the stylus 1 can vibrate when the user hits a baseball with the bat 800.

According to various example embodiments, the stylus 1 may include a motion sensor for detecting a motion of the stylus 1. The motion sensor can measure acceleration or an angular velocity of the stylus 1 to swing the bat 800. For example, the user can be allowed to swing the bat 800 when the stylus 1 moves at a speed greater than or equal to a specific acceleration. If the stylus 1 receives a vibration command delivered from the first electronic device 100 through near field communication, the vibration command can be stored in a memory of the stylus 1. In this case, if the stylus 1 makes a swing motion in the baseball game, the stylus 1 may autonomously vibrate without having to receive the vibration command from the first electronic device 100.

For example, the stylus 1 can receive a vibration command delivered from the first electronic device 100 through near field communication, and the vibration command can be stored in a memory. In this case, the stylus 1 can provide the vibration command so as to vibrate according to an application executed in the first electronic device 100. For example, if the vibration command is not stored in the memory, the stylus 1 can receive the vibration command from the first electronic device 100 according to the input in the first electronic device 100.

Figure 9:
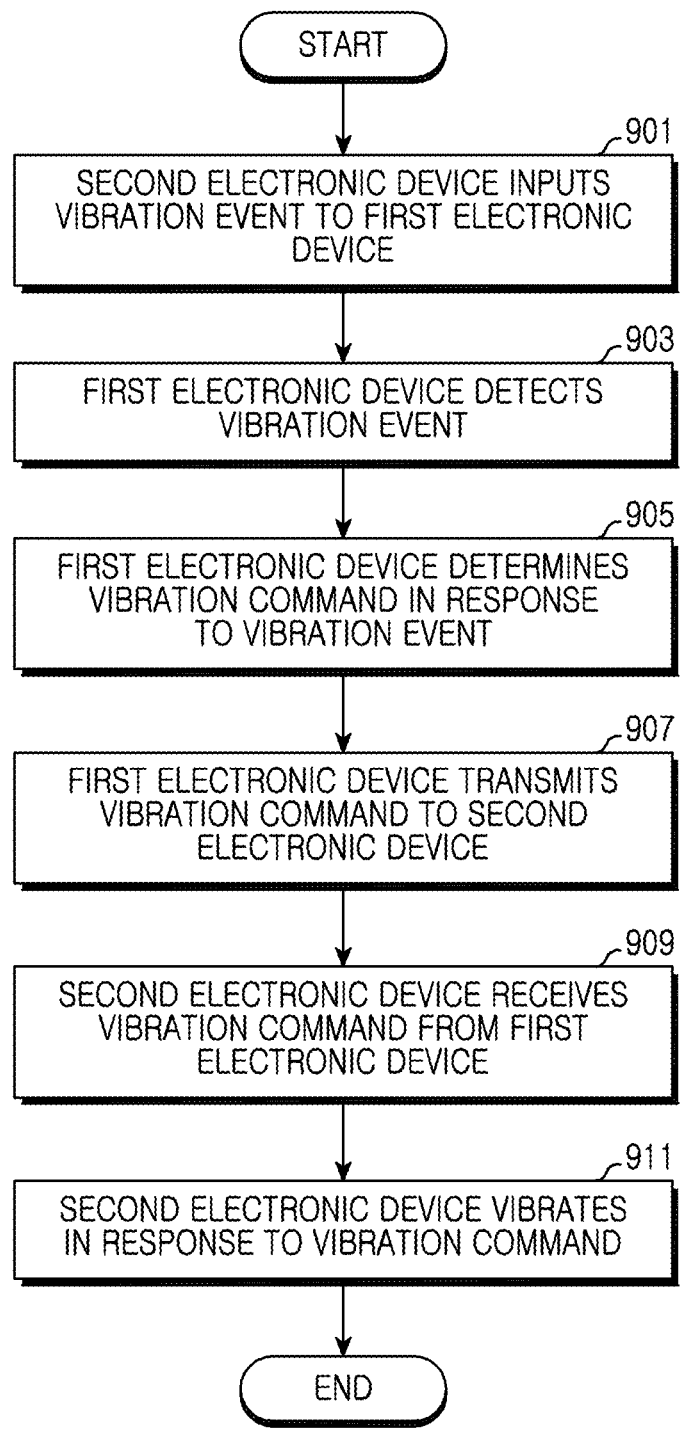
FIG. 9 is a flowchart illustrating an example sequence of steps for operating a first electronic device and a stylus according to one of various example embodiments of the present disclosure.

According to various example embodiments, if the user plays a racing game, the stylus 1 may vibrate in response to, for example, a burst of speed, an abrupt direction change, and sudden braking FIG. 9 is a flowchart illustrating a method of operating a first electronic device and a stylus according to one of various example embodiments of the present disclosure.

Referring to FIG. 9, the second electronic device 200 can input a vibration event to the first electronic device 100 in step 901. Herein, the second electronic device 200 may be a stylus for providing an input/output, a mouse pen, and various electronic devices. In addition, the first electronic device 100 may be a mobile phone including the touch screen 190, a media player, a tablet computer, a handheld computer, or a PDA. In addition, it may be any portable electronic device including a device which combines two or more functions among these devices.

According to various example embodiments, the vibration event may be an operation in which the second electronic device 200 performs any one of a flicking, a touch-and-drag, a tap-and-hold, and a multi-tap on the touch screen 190 of the first electronic device 100.

According to various example embodiments, the vibration event may be an event which is input by the second electronic device 200 in a state where the first electronic device 100 executes any one of a flash content, an Internet web page, and an application.

In step 903, the first electronic device 100 can detect the vibration event. According to various example embodiments, the first electronic device 100 may include the pen touch panel 193 capable of detecting the vibration event of the second electronic device 200 in the touch screen 190. For example, if the second electronic device 200 is implemented with the stylus 1, a contact touch or non-contact touch of the stylus 1 can be detected. For example, the touch screen 190 can apply a touch detection technique, and can further apply any multi-touch technique including other proximity sensor arrays or other elements.

In step 905, the first electronic device 100 can determine a vibration command in response to the vibration event. Herein, the vibration command may include a command for controlling a vibration member of the second electronic device 200 to vibrate at a specific time and a specific strength. In addition, the vibration command may also include a vibration change depending on a vibration time.

In step 907, the first electronic device 100 can transmit the vibration command to the second electronic device 200. According to various example embodiments, the first electronic device 100 can be connected with the second electronic device 200 in a wired or wireless fashion, and in case of a wireless connection, a near field communication scheme can be used. For example, the near field communication scheme may include Bluetooth communication, NFC, wireless hart communication, Zigbee communication, WiFi communication, etc., and can be connected using Bluetooth or WiFi.

In step 909, the second electronic device 200 can receive a vibration command from the first electronic device 100. Herein, the vibration command may include a command for controlling a vibration member of the second electronic device 200 to vibrate at a specific time and a specific strength. The vibration command can be stored in the memory 250 of the second electronic device 200. For example, the vibration command can be arbitrarily set by the user.

In step 911, the second electronic device 200 can vibrate in response to the vibration command. For example, the second electronic device 200 may include a plurality of vibration members disposed such that at least a portion thereof overlaps. The plurality of vibration members can vibrate at a specific time and a specific strength in response to a command included in the vibration command.

Thereafter, the procedure of FIG. 9 ends.

An instruction set for each of the above steps can be stored in the memory as one or more modules. In this case, a module stored in the memory can be executed by at least one processor 112 and controller 220.

Figure 10:
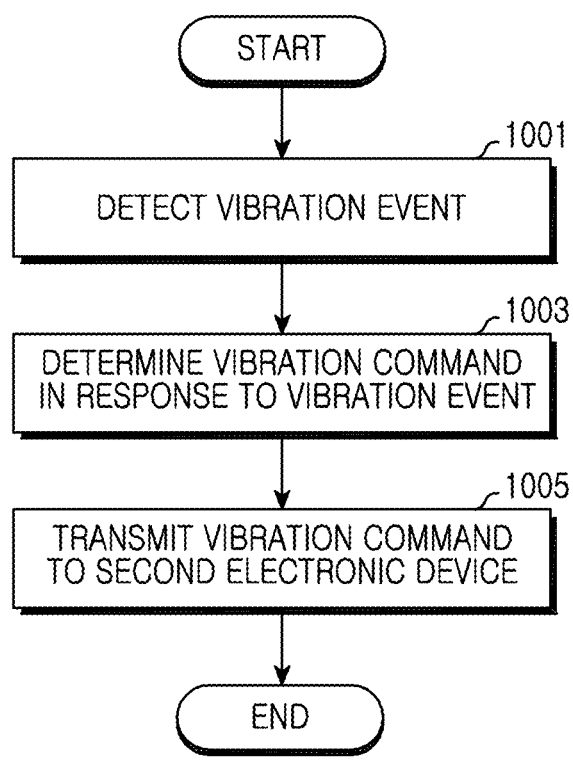
FIG. 10 is a flowchart illustrating an example sequence of steps for operating a first electronic device according to one of various example embodiments of the present disclosure.

FIG. 10 is a flowchart illustrating a method of operating a first electronic device according to one of various example embodiments of the present disclosure.

Referring to FIG. 10, the first electronic device 100 can detect a vibration event in step 1001. Herein, the first electronic device 100 may be a mobile phone including the touch screen 190, a media player, a tablet computer, a handheld computer, or a PDA. In addition, it may be any portable electronic device including a device which combines two or more functions among these devices.

According to various example embodiments, the vibration event may be an operation in which the second electronic device 200 performs any one of a flicking, a touch-and-drag, a tap-and-hold, and a multi-tap on the touch screen 190 of the first electronic device 100. Herein, the second electronic device 200 may be a stylus for providing an input/output, a mouse pen, and various electronic devices.

According to various example embodiments, the first electronic device 100 may include the pen touch panel 193 capable of detecting a vibration event of the second electronic device 200 in the touch screen 190. For example, if the second electronic device 200 is implemented with the stylus 1, a contact touch or non-contact touch of the stylus 1 can be detected. For example, the touch screen 190 can apply a touch detection technique, and can further apply any multi-touch technique including other proximity sensor arrays or other elements.

According to various example embodiments, the vibration event may be an event which is input from the second electronic device 200 in a state where the first electronic device 100 executes any one of a flash content, an Internet web page, and an application.

In step 1003, a vibration command can be determined in response to the vibration event. Herein, the vibration command may include a command for controlling a vibration member of the second electronic device 200 to vibrate at a specific time and a specific strength. In addition, the vibration command may also include a vibration change depending on a vibration time.

In step 1005, the vibration command can be transmitted to the second electronic device 200. According to various example embodiments, the first electronic device 100 can be connected with the second electronic device 200 in a wired or wireless fashion, and in case of a wireless connection, a near field communication scheme can be used. For example, the near field communication scheme may include Bluetooth communication, NFC, wireless hart communication, Zigbee communication, WiFi communication, etc., and can be connected using Bluetooth or WiFi.

Thereafter, the procedure of FIG. 10 ends.

An instruction set for each of the above steps can be stored in the memory as one or more modules. In this case, a module stored in the memory can be executed by at least one processor 112.

Figure 11:
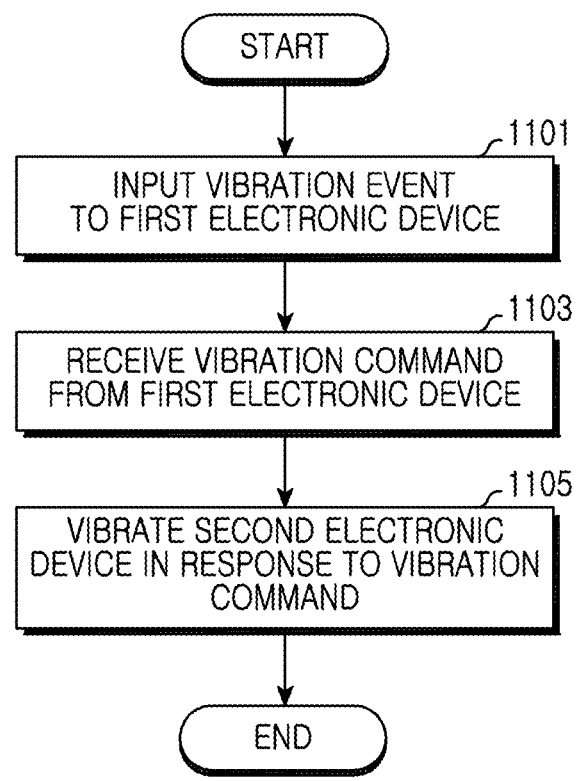
FIG. 11 is a flowchart illustrating an example sequence of steps for operating a second electronic device according to one of various example embodiments of the present disclosure.

FIG. 11 is a flowchart illustrating a method of operating a second electronic device according to one of various example embodiments of the present disclosure.

Referring to FIG. 11, the second electronic device 200 can input a vibration event to the first electronic device 100 in step 1101. Herein, the second electronic device 200 may be a stylus for providing an input/output, a mouse pen, and various electronic devices. In addition, the first electronic device 100 may be a mobile phone including a touch screen 190, a media player, a tablet computer, a handheld computer, or a PDA. In addition, it may be any portable electronic device including a device which combines two or more functions among these devices.

According to various example embodiments, the vibration event may be an operation in which the second electronic device 200 performs any one of a flicking, a touch-and-drag, a tap-and-hold, and a multi-tap on the touch screen 190 of the first electronic device 100.

According to various example embodiments, the vibration event may be an event which is input from the second electronic device 200 in a state where the first electronic device 100 executes any one of a flash content, an Internet web page, and an application.

In step 1103, a vibration command can be received from the first electronic device 100. Herein, the vibration command may include a command for controlling a vibration member of the second electronic device 200 to vibrate at a specific time and a specific strength. In addition, the vibration command may also include a vibration change depending on a vibration time.

According to various example embodiments, the second electronic device 200 can be connected with the first electronic device 100 in a wired or wireless fashion, and in case of a wireless connection, a near field communication scheme can be used. For example, the near field communication scheme may include Bluetooth communication, NFC, wireless hart communication, Zigbee communication, WiFi communication, etc., and can be connected using Bluetooth or WiFi.

In step 1105, the second electronic device 200 can vibrate in response to the vibration command. For example, the second electronic device 200 may include a plurality of vibration members disposed such that at least a portion of the vibration members overlaps. The plurality of vibration members can vibrate at a specific time and a specific strength in response to a command included in the vibration command.

Thereafter, the procedure of FIG. 11 ends.

An instruction set for each of the above steps can be stored in the memory as one or more modules. In this case, a module stored in the memory can be executed by at least one controller 220.

Figure 12:
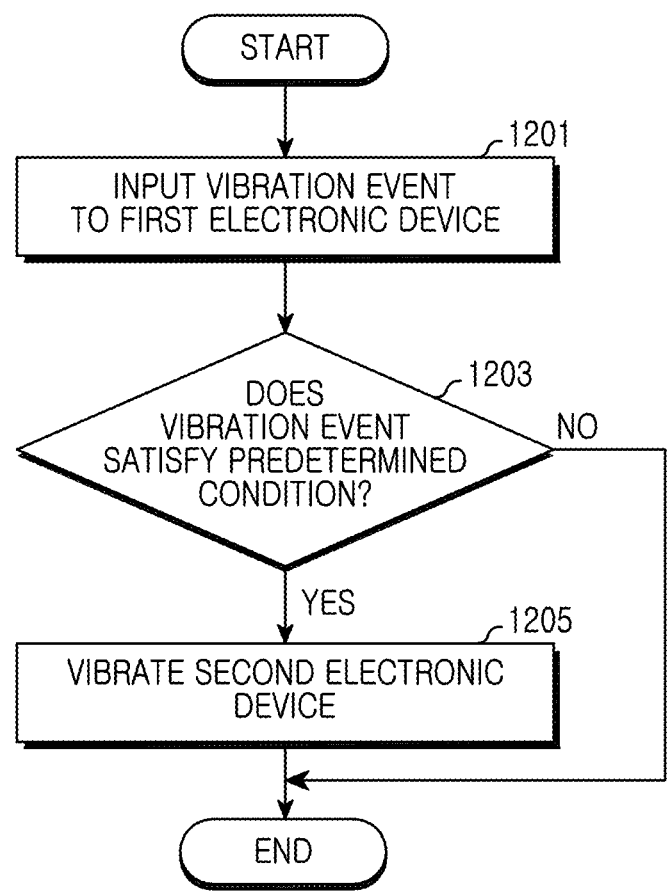
FIG. 12 is a flowchart illustrating an example sequence of steps for operating a second electronic device according to one of various example embodiments of the present disclosure.

FIG. 12 is a flowchart illustrating a method of operating a second electronic device according to one of various example embodiments of the present disclosure.

Referring to FIG. 12, the second electronic device 200 can input a vibration event to the first electronic device 100 in step 1201. Herein, the second electronic device 200 may be a stylus for providing an input/output, a mouse pen, and various electronic devices. In addition, the first electronic device 100 may be a mobile phone including the touch screen 190, a media player, a tablet computer, a handheld computer, or a PDA. In addition, it may be any portable electronic device including a device which combines two or more functions among these devices.

According to various example embodiments, the vibration event may include motion information for a motion of the second electronic device 200. Herein, the motion information may include acceleration information or angular velocity information indicating acceleration or a change in angular velocity of the second electronic device 200. For example, the motion acceleration or the motion angular speed can be detected by a motion sensor including at least one of a gyro sensor or an acceleration sensor.

According to various example embodiments, the vibration event may be an event which is input by the second electronic device 200 in a state where the first electronic device 100 executes any one of a flash contents, an Internet web page, and an application.

In step 1203, it can be determined whether the vibration event satisfies a predetermined condition. According to various example embodiments, it can be determined whether a size of the motion acceleration or a size of the motion angular speed of the second electronic device 200 is greater than or less than a predetermined value. For example, if the size of the motion acceleration or the size of the motion angular speed of the second electronic device 200 is greater than the predetermined value, it can be determined that the predetermined condition is satisfied. If it is less than the predetermined value, it can be determined that the predetermined condition is not satisfied. For example, the predetermined value can be stored in the memory 250 or can be arbitrarily set by the user.

In step 1205, the second electronic device 200 can vibrate. For example, the second electronic device 200 may include a plurality of vibration members disposed such that at least a portion of the vibration members overlaps. The plurality of vibration members can vibrate at a specific time and a specific strength in response to a command included in the vibration command. In addition, the memory 250 may include a command including a vibration change depending on a vibration time.

Thereafter, the procedure of FIG. 12 ends.

An instruction set for each of the above steps can be stored in the memory as one or more modules. In this case, a module stored in the memory can be executed by at least one controller 220.

According to various example embodiments of the present disclosure, an intuitive interface such as various haptic effects can be provided by using a second electronic device having an input means capable of performing a contact touch input or a non-contact touch input and a sound input/output means.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se.

According to various example embodiments of the present disclosure, each of the modules can be configured with a software component, a firmware component, a hardware component, or a combination thereof. In addition, some or all modules can be configured as one entity, and a function of each module can be identically performed. According to various example embodiments of the present disclosure, each of operations can be executed in sequence, repetition, or parallel. In addition, some operations may be omitted, or may be executed by adding other operations. For example, each of operations can be executed by a corresponding module described in the present disclosure.

Methods based on the embodiments disclosed in the claims and/or specification of the present disclosure can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in an electronic device. The one or more programs include instructions for allowing the electronic device to execute the methods based on the embodiments disclosed in the claims and/or specification of the present disclosure.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory may be plural in number.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can access via an external port to the electronic device.

In addition, an additional storage unit on a communication network can access to a portable electronic device.

The functions and process steps herein may be performed automatically or wholly or partially in response to user command. An activity (including a step) performed automatically is performed in response to executable instruction or device operation without user direct initiation of the activity.

While the present disclosure has been particularly shown and described with reference to example embodiments thereof, it will be understood by those skilled in the art that various changes in form and details may be made therein without departing from the present disclosure as defined by the appended claims.

What is claimed is:

1. An operation method in an electronic device, the method comprising:
   activating an application among a plurality of applications installed in the electronic device, wherein the activated application provides a vibration command on contents associated with the activated application;
   detecting a hovering input from an electronic pen spaced away from a touch screen operably coupled to with the electronic device, wherein the hovering input is a change in inductance generated by a magnetic member of the electronic pen movably disposed within a housing of the electronic pen and a coil member fixed within the housing;
   determining the vibration command based on both the detected hovering input and the activated application; and
   transmitting the determined vibration command to the electronic pen,
   wherein the vibration command is used for controlling a plurality of vibrators of the electronic pen, and
   wherein the vibration command includes an instruction to sequentially vibrate in a prespecified order in response to detecting a prespecified event.

2. The method of claim 1, wherein the sequential vibration of all of the plurality of vibrators in the prespecified order is executed in response to detecting the prespecified event singly, and wherein determining the vibration command further comprises detecting whether a currently displayed screen is unscrollable by the electronic pen in a particular direction, and the determined vibration command includes an instruction to vibrate when the displayed screen is unscrollable by the electronic pen in the particular direction.

3. The method of claim 1, wherein the hovering input from the electronic pen includes motion information of the electronic pen.

4. The method of claim 1, wherein the electronic device and the electronic pen communicate via a near field communication with each other.

5. The method of claim 1, further comprising:
   in response to the hovering input from the electronic pen, controlling the touch screen to display contents for the activated application.

6. The method of claim 1, wherein the vibration command is associated with at least one of a vibration duration, a vibration strength, and a vibration sequence of the electronic pen.

7. The method of claim 1, wherein the plurality of vibrators include a first vibrator disposed proximate to a first terminal end of the electronic pen, a second vibrator disposed proximate to a second terminal end opposite the first terminal end, and a third vibrator disposed along a body of the electronic pen between the first vibrator and the second vibrator.

8. An operation method in an electronic pen for an electronic device with a touch screen and a memory, the method comprising:
   transmitting a hovering input to the electronic device spaced away from the electronic pen;
   receiving, from the electronic device, a vibration command based on at least part of the hovering input, wherein the hovering input is a change in inductance generated by a magnetic member of the electronic pen movably disposed within a housing of the electronic pen and a coil member fixed within the housing; and
   controlling a plurality of vibrators of the electronic pen according to the received vibration command,
   wherein the vibration command is determined, at the electronic device, based on the hovering input from the electronic pen and an activated application, and
   wherein the vibration command includes an instruction to sequentially vibrate the plurality of vibrators in a prespecified order in response to detecting a prespecified event.

9. The method of claim 8, wherein, the sequential vibration of the plurality of vibrators in the prespecified order is executed in response to detecting the prespecified event singly.

10. The method of claim 8, wherein the hovering input includes motion information of the electronic device.

11. The method of claim 8, wherein the electronic device and the electronic pen communicate via a near field communication with each other.

12. The method of claim 8, wherein the plurality of vibrators are disposed axially along a shaft of the electronic pen.

13. The method of claim 8, wherein the vibration command is associated with at least one of a vibration duration, a vibration strength, and a vibration sequence of the electronic pen.

14. The method of claim 8, wherein the plurality of vibrators include a first vibrator disposed proximate to a first terminal end of the electronic pen, a second vibrator disposed proximate to a second terminal end opposite the first terminal end, and a third vibrator disposed along a body of the electronic pen between the first vibrator and the second vibrator.

15. An electronic device comprising:
    a touch screen configured to interact electromagnetically with an electronic pen;
    a communication unit configured to communicate with the electronic pen; and
    a processor configured to:
        activate an application among a plurality of applications installed in the electronic device, wherein the activated application provides a vibration command on contents associated with the activated application;
        detect a hovering input from the electronic pen spaced away from the touch screen via the communication unit, wherein the hovering input is a change in inductance generated by a magnetic member of the electronic pen movably disposed within a housing of the electronic pen and a coil member fixed within the housing;
        determine the vibration command based on both the detected hovering input and the activated application; and
        control the communication unit to transmit the determined vibration command to the electronic pen,
    wherein the vibration command is used for controlling a plurality of vibrators of the electronic pen, and
    wherein the vibration command includes an instruction to sequentially vibrate the plurality of vibrators in a prespecified order in response to detecting a prespecified event.

16. The electronic device of claim 15, wherein the sequential vibration of all of the plurality of vibrators in the prespecified order is executed in response to detecting the prespecified event singly,
    wherein determining the vibration command further comprises detecting whether a currently displayed screen is unscrollable by the electronic pen in a particular direction, and the determined vibration command includes an instruction to vibrate when the displayed screen is unscrollable by the electronic pen in the particular direction.

17. The electronic device of claim 15, wherein the hovering input from the electronic pen includes motion information of the electronic pen.

18. The electronic device of claim 15, wherein the electronic device and the electronic pen communicate via a near field communication with each other.

19. The electronic device of claim 15, wherein the processor is further configured to control the touch screen to display contents for the activated application in response to the hovering input from the electronic pen.

20. The electronic device of claim 15, wherein the vibration command is associated with at least one of a vibration duration, a vibration strength, and a vibration sequence of the electronic pen.

21. The electronic device of claim 15, wherein the plurality of vibrators include a first vibrator disposed proximate to a first terminal end of the electronic pen, a second vibrator disposed proximate to a second terminal end opposite the first terminal end, and a third vibrator disposed along a body of the electronic pen between the first vibrator and the second vibrator.

22. An electronic pen comprising:
    a resonance circuit configured to electromagnetically interact with a touch screen of an external electronic device, wherein the external electronic device detects a hovering input from the electronic pen spaced away from the touch screen of the external electronic device, wherein the hovering input is generated by a change in inductance generated by a magnetic member of the electronic pen movably disposed within a housing of the electronic pen and a coil member fixed within the housing;
    a receiver configured to wirelessly receive a vibration command from the external electronic device, wherein the vibration command is based on at least part of the hovering input; and
    a plurality of vibrators configured to vibrate under control of a controller, the controller configured to control the plurality of vibrators according to the received vibration command,
    wherein the vibration command is determined, at the electronic device, based on the hovering input from the electronic pen and an activated application, and
    wherein the vibration command includes an instruction to sequentially vibrate all of the plurality of vibrators in a prespecified order in response to detecting a prespecified event.

23. The electronic pen of claim 22, further comprising at least one sensor configured to obtain motion information of the electronic pen; and
    a transmitter configured to wirelessly transmit the motion information to the external electronic device,
    wherein the vibration command transmitted from the external electronic device is further based on the motion information, and
    wherein the sequential vibration of all of the plurality of vibrators in the prespecified order is executed in response to detecting the prespecified event singly.

24. The electronic pen of claim 22, wherein the electronic device and the electronic pen communicate via a near field communication with each other.

25. The electronic pen of claim 22, wherein the plurality of vibrators are disposed axially along a shaft of the electronic pen.

26. The electronic pen of claim 22, wherein the vibration command is associated with at least one of a vibration duration, a vibration strength, and a vibration sequence of the electronic pen.

27. The electronic pen of claim 22, wherein the plurality of vibrators include a first vibrator disposed proximate to a first terminal end of the electronic pen, a second vibrator disposed proximate to a second terminal end opposite the first terminal end, and a third vibrator disposed along a body of the electronic pen between the first vibrator and the second vibrator.

* * * * *